US009241109B2

(12) United States Patent
Watanabe

(10) Patent No.: US 9,241,109 B2
(45) Date of Patent: Jan. 19, 2016

(54) IMAGE CAPTURING APPARATUS, CONTROL METHOD, AND RECORDING MEDIUM FOR MOVING IMAGE GENERATION

(71) Applicant: CANON KABUSHIKI KAISHA, Tokyo (JP)

(72) Inventor: Shinobu Watanabe, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 23 days.

(21) Appl. No.: 13/863,947

(22) Filed: Apr. 16, 2013

(65) Prior Publication Data

US 2013/0286254 A1 Oct. 31, 2013

(30) Foreign Application Priority Data

Apr. 27, 2012 (JP) ................................. 2012-103830

(51) Int. Cl.
*H04N 5/235* (2006.01)
*H04N 5/232* (2006.01)
*H04N 5/355* (2011.01)
*H04N 5/357* (2011.01)

(52) U.S. Cl.
CPC ......... *H04N 5/2355* (2013.01); *H04N 5/23296* (2013.01); *H04N 5/3572* (2013.01); *H04N 5/35572* (2013.01)

(58) Field of Classification Search
CPC ............ H04N 5/2355; H04N 5/35536; H04N 5/33572; H04N 5/33581
USPC ................................ 348/218.1, 229.1, 230.1
See application file for complete search history.

(56) References Cited

U.S. PATENT DOCUMENTS

| | | | | |
|---|---|---|---|---|
| 7,505,633 | B2 * | 3/2009 | Kitajima | 382/284 |
| 7,834,915 | B2 * | 11/2010 | Wakazono et al. | 348/229.1 |
| 8,542,287 | B2 * | 9/2013 | Griffith et al. | 348/218.1 |
| 8,711,248 | B2 * | 4/2014 | Jandhyala et al. | 348/208.1 |
| 2003/0133019 | A1 * | 7/2003 | Higurashi et al. | 348/218.1 |

(Continued)

FOREIGN PATENT DOCUMENTS

| | | |
|---|---|---|
| JP | 06-292207 A | 10/1994 |
| JP | 07-097841 A | 10/1995 |

(Continued)

OTHER PUBLICATIONS

Kang et al.; "High Dynamic Range Video"; ACM Transactions on Graphics; vol. 22, Issue 3; Jul. 2003; pp. 319-325.*

*Primary Examiner* — John Villecco
(74) *Attorney, Agent, or Firm* — Cowan, Liebowitz & Latman, P.C.

(57) ABSTRACT

An image capturing apparatus sequentially obtains images obtained by image capturing of a subject and detects the angle of view of each obtained image at the time of image capturing. The apparatus sequentially selects a plurality of images, of the obtained images, which are used to generate one frame. The apparatus combines the selected images to generate a moving image including an obtained composite image as a frame. If the selected images differ in angle of view at the time of image capturing, the apparatus changes all the selected images into images having the same angle of view and the same number of pixels by adjusting angles of view of selected images which differ in angle of view from one reference image of the selected images, and combines the images.

13 Claims, 10 Drawing Sheets

(56) References Cited

U.S. PATENT DOCUMENTS

2005/0128323 A1* 6/2005 Choi .............................. 348/239
2007/0242900 A1* 10/2007 Chen et al. ..................... 382/294
2008/0043116 A1* 2/2008 Lappi et al. ................ 348/222.1
2008/0211956 A1* 9/2008 Imada et al. ................... 348/340
2010/0007776 A1* 1/2010 Iwabuchi ....................... 348/241
2010/0118161 A1* 5/2010 Tsurumi .................... 348/231.3
2011/0149106 A1* 6/2011 Kino .......................... 348/222.1
2011/0205381 A1* 8/2011 Vranceanu et al. ........ 348/217.1
2012/0069213 A1* 3/2012 Jannard et al. ............. 348/229.1
2012/0105681 A1* 5/2012 Morales ......................... 348/239
2012/0218442 A1* 8/2012 Jandhyala et al. ............ 348/239
2012/0293685 A1* 11/2012 Garten ....................... 348/229.1
2012/0307102 A1* 12/2012 Yuyama ..................... 348/222.1
2013/0121525 A1* 5/2013 Chen et al. ..................... 382/100
2013/0223759 A1* 8/2013 Nishiyama ..................... 382/284
2013/0242059 A1* 9/2013 Dahi et al. ....................... 348/47
2013/0314568 A1* 11/2013 Vranceanu et al. ........... 348/239
2013/0329090 A1* 12/2013 Ise ........................... 348/240.99
2014/0063229 A1* 3/2014 Olsson et al. ................... 348/84

FOREIGN PATENT DOCUMENTS

JP 11-250238 A 9/1999
JP 11-250239 A 9/1999
JP 11-250240 A 9/1999
JP 2002094860 A * 3/2002
JP 2013255201 A * 12/2013

* cited by examiner

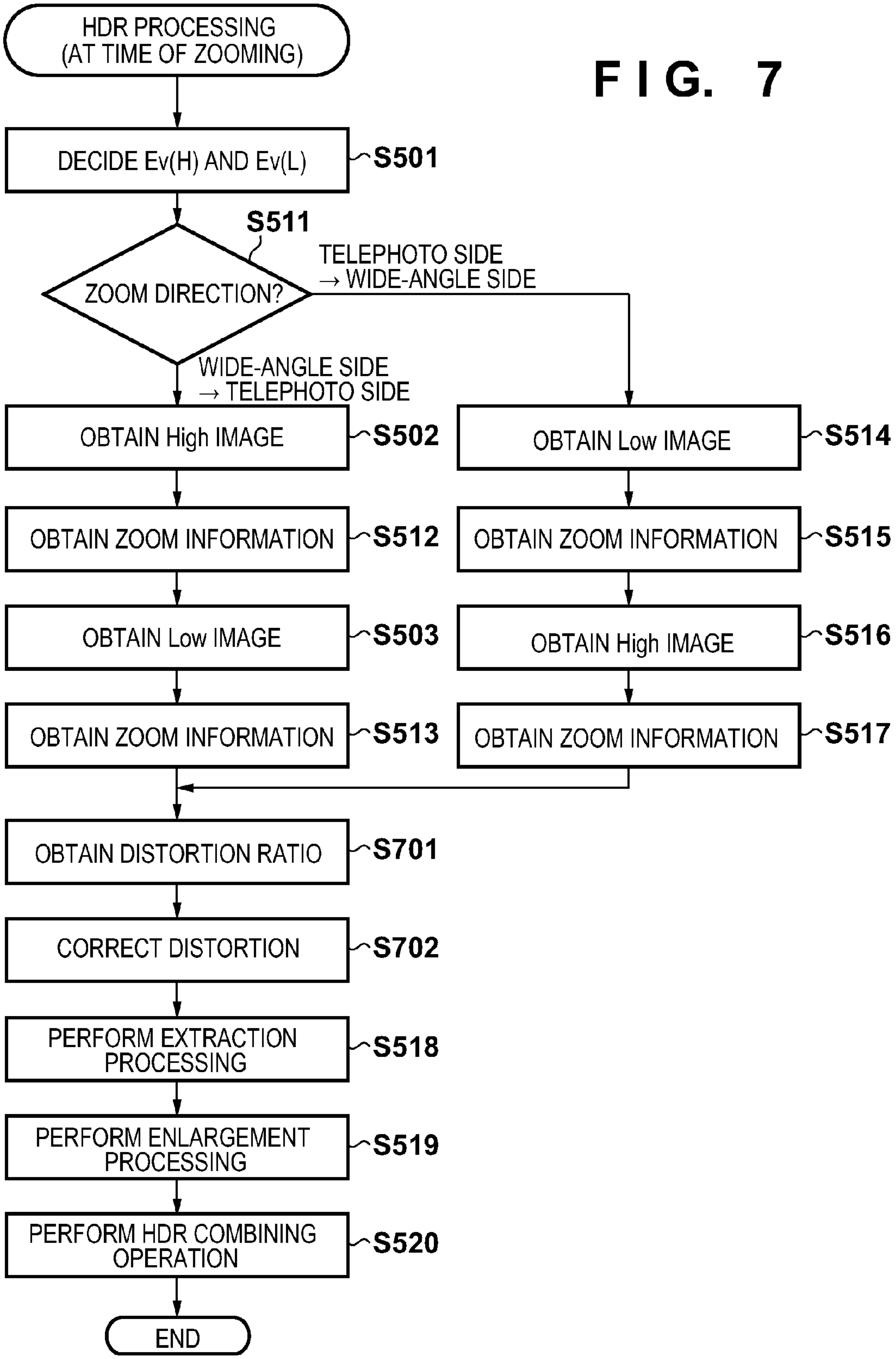
F I G. 7

IMAGE CAPTURING APPARATUS, CONTROL METHOD, AND RECORDING MEDIUM FOR MOVING IMAGE GENERATION

BACKGROUND OF THE INVENTION

1. Field of the Invention

The present invention relates to an image capturing apparatus, a control method, and a recording medium, and particularly to, a technique of generating a moving image using a composite image obtained by combining a plurality of images as a frame.

2. Description of the Related Art

In general, the tonal range (dynamic range) of an image sensor such as a CCD or CMOS sensor used for an image capturing apparatus such as a digital camera is narrower than the tonal range of a silver halide film. A narrow range may lead to blown-out highlight on a high-luminance subject or shadow-detail loss on a low-luminance subject in a captured image obtained by image capturing depending on an image capturing environment.

Recently, there is available an image capturing apparatus using such an image sensor, which generates a so-called HDR (High Dynamic Range) image with an enhanced tonal range by combining a plurality of images obtained by image capturing of a subject at different exposures. The generation of an HDR image uses, for example, an intermediate-exposure image captured at an exposure set as a proper exposure for a subject, a high-exposure image captured at an exposure leading to overexposure, and a low-exposure image captured at an exposure leading to underexposure (Japanese Patent Publication No. 7-97841).

An image correction technique of combining a plurality of images obtained by image capturing of the same subject as in the case of the generation of an HDR image is also used for, for example, a camera shake compensation technique. Note that in such an image correction technique, all the images need to be obtained in advance by image capturing of a subject at the same angle of view.

The above image correction technique can be applied to moving image capturing as well as still image capturing. That is, it is possible to generate, for example, a moving image (HDR moving image) with an enhanced tonal range by using, as a final moving image frame, an image obtained by combining a plurality of frames of a captured moving image.

In moving image capturing, when selecting frames to be used for combining operation according to a predetermined rule, the selected frames sometimes differ in angle of view. That is, in moving image capturing, frames may differ in angle of view due to the zooming operation performed by the operator. For this reason, the moving image obtained by generating frames using the above image correction technique may have portions with different image qualities within a frame or exhibit different image qualities between frames.

SUMMARY OF THE INVENTION

The present invention has been made in consideration of the above problems in the prior art. The present invention provides an image capturing apparatus which generates a moving image with preferred image quality by using a frame obtained by combining a plurality of frames of a moving image, a control method, and a recording medium.

The present invention in its first aspect provides an image capturing apparatus comprising: an obtaining unit configured to sequentially obtain images obtained by image capturing of a subject; a selection unit configured to sequentially select a plurality of images, of the images obtained by the obtaining unit, which are used to generate one frame; and a generation unit configured to combine the plurality of images selected by the selection unit and generate a moving image including an obtained composite image as a frame, wherein if the plurality of images differ in angle of view at the time of image capturing, the generation unit changes all the plurality of images into images having the same angle of view and the same number of pixels by adjusting angles of view of images which differ in angle of view from one reference image, as a reference, of the plurality of images, and combines the images.

Further features of the present invention will become apparent from the following description of exemplary embodiments (with reference to the attached drawings).

BRIEF DESCRIPTION OF THE DRAWINGS

FIG. 7 is a flowchart exemplifying HDR processing (at the time of zooming) executed by the digital camera 100 according to a modification of the present invention.

DESCRIPTION OF THE EMBODIMENTS

[Embodiment]

An exemplary embodiment of the present invention will be described in detail below with reference to the accompanying drawings. The embodiment described below will exemplify a case in which the present invention is applied to a digital camera, as an example of an image capturing apparatus, which can capture HDR moving images. However, the present invention can be applied to an arbitrary device which can generate one frame of a moving image by combining a plurality of images sequentially obtained by image capturing.

<<Arrangement of Digital Camera 100>>

Figure 1A:
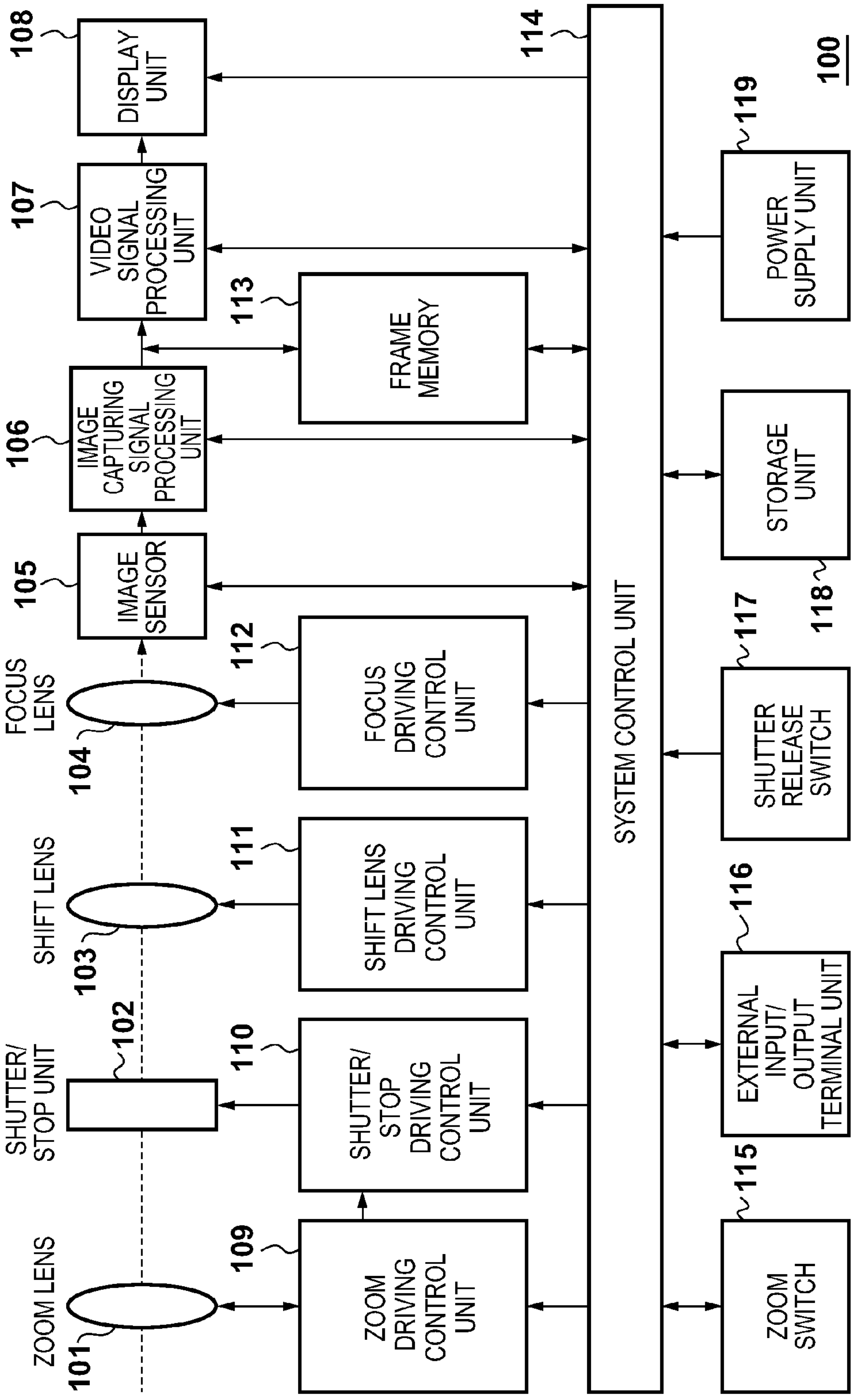
FIGS. 1A and 1B are block diagrams each showing the functional arrangement of a digital camera 100 according to an embodiment of the present invention.

FIG. 1A is a block diagram showing the functional arrangement of a digital camera 100 according an embodiment of the present invention.

A system control unit 114 is, for example, a CPU, which controls the operation of each block of the digital camera 100. More specifically, the system control unit 114 reads out operation programs for HDR moving image capturing processing (to be described later) stored in a ROM (not shown), extracts the programs in a RAM (not shown), and executes them, thereby controlling the operation of each block.

The digital camera 100 according to this embodiment includes an image capturing optical system having a so-called three-group arrangement constituted by a zoom lens 101, a shift lens 103, and a focus lens 104. The zoom lens 101 as the first group lens changes its position in the optical axis direction to change the magnification of a subject image in an optical image formed on an image sensor 105 (to be described later). A zoom driving control unit 109 drives the zoom lens 101. The shift lens 103 as the second lens group changes its position within a plane almost perpendicular to the optical axis to move the position of an optical image formed on the image sensor 105, thereby implementing a camera shake compensation optical system. A shift lens driving control unit 111 drives the shift lens 103. The focus lens 104 as the third group lens changes its position in the optical axis direction to perform focus adjustment for the optical image formed on the image sensor 105. A focus driving control unit 112 drives the focus lens 104 during focus adjusting operation.

A mechanical shutter/stop unit 102 is provided between the zoom lens 101 and the shift lens 103 on the optical axis of the image capturing optical system. A shutter/stop driving control unit 110 drives the mechanical shutter/stop unit 102 in accordance with a shutter speed and an aperture value as set exposure settings. Driving the mechanical shutter/stop unit 102 allows the image sensor 105 to output images obtained at different exposures.

The image sensor 105 is a charge-accumulation type photoelectric conversion device such as a CCD or CMOS sensor. The image sensor 105 photoelectrically converts the optical image formed on the light-receiving surface via the image capturing optical system and outputs the analog image signal to an image capturing signal processing unit 106. In this embodiment, the image sensor 105 sequentially outputs the images obtained by image capturing at 60 fps at the time of moving image capturing. The image sensor 105 and the image capturing optical system alternately switch exposure settings for images to be captured to alternately output a high-exposure image (High image) with a high exposure and a low-exposure image (Low image) with a low exposure, as will be described later.

The image capturing signal processing unit 106 converts the analog image signal output from the image sensor 105 into a video signal by applying A/D conversion processing to the signal. The image capturing signal processing unit 106 outputs the obtained video signal as image data to a frame memory 113 and causes it to store the data. The frame memory 113 is a storage area which stores the image data output from the image capturing signal processing unit 106.

A video signal processing unit 107 generates a composite image as a frame of an HDR moving image with an enhanced tonal range from a plurality of image data stored in the image capturing signal processing unit 106. Although this embodiment will exemplify the video signal processing unit 107 which generates a composite image as one frame of an HDR moving image by using two types of image data including High and Low images described above, it is readily anticipated that the number of images and the like are not limited to those described above.

A display unit 108 is a display device of the digital camera 100 such as an LCD. The display unit 108 functions as an electronic viewfinder by displaying the image signal output from the image sensor 105. Upon receiving an instruction to play back a still image, moving image, or the like stored in a storage unit 118 (to be described later), the display unit 108 displays the image or moving image to which the instruction to play back is issued.

A zoom switch 115 and a shutter release switch 117 are user interfaces of the digital camera 100. The zoom switch 115 and the shutter release switch 117 are operation members respectively provided to issue a zoom instruction and an image capturing instruction. When the user operates the zoom switch 115 or the shutter release switch 117, the system control unit 114 detects the corresponding operation based on the control signal output from the operation member.

An external input/output terminal unit 116 is an external connection interface such as a USB, which is used to connect the digital camera 100 to another device. The storage unit 118 is, for example, the embedded memory of the digital camera 100 or a recording device detachably connected to the digital camera 100, such as an HDD or memory card. The storage unit 118 stores the still image or moving image obtained upon reception of an image capturing instruction. A power supply unit 119 is the power supply unit of the digital camera 100. For example, a battery or external commercial power supply is connected to the digital camera 100 via an adapter or the like and supplies power to each block of the digital camera 100 under the control of the system control unit 114.

<Internal Arrangement of Zoom Driving Control Unit 109>

Figure 1B:
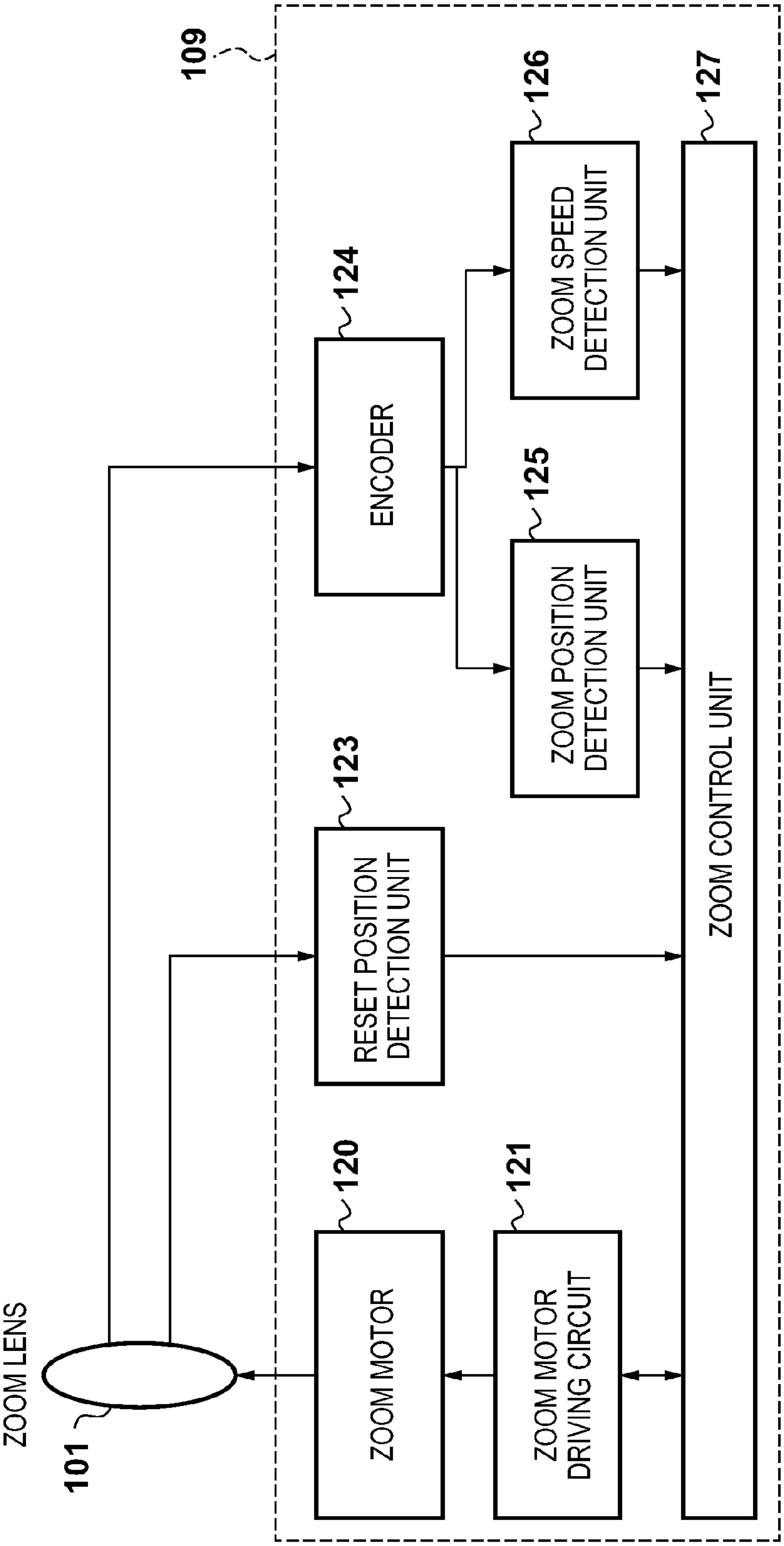

The internal arrangement of the zoom driving control unit 109 will be described in detail below with reference to FIG. 1B.

Upon detecting that the user has operated the zoom switch 115, the system control unit 114 transmits a control signal associated with a driving instruction for the zoom lens 101 to the zoom driving control unit 109. A zoom control unit 127 receives the control signal input to the zoom driving control unit 109 in this manner. The zoom control unit 127 controls a zoom motor driving circuit 121 in accordance with the control signal to change the position of the zoom lens 101 by driving a zoom motor 120. The zoom motor 120 is, for example, a DC (Direct Current) motor.

Note that a reset position detection unit 123 and an encoder 124 detect the information of the driving position of the zoom lens 101 moved by the zoom motor 120. The reset position detection unit 123 is a sensor which detects whether the zoom lens 101 is located at the reset position. The zoom control unit 127 can accurately detect the position of the zoom lens 101 by receiving, from the reset position detection unit 123, a signal indicating that the zoom lens 101 is located at the reset position, that is, a reference position in driving control.

The encoder 124 rotates together with the movement of the zoom lens 101 and outputs a pulse signal when the encoder rotates through a predetermined angle. A zoom position detection unit 125 obtains a zoom position, that is, the information of the position of the zoom lens 101, based on the pulse signal output from the encoder 124. A zoom speed detection unit 126 obtains a zoom speed, that is, the information of the operating speed of the zoom lens 101, based on the pulse signal output from the encoder 124. The information of the zoom position and the information of the zoom speed obtained by the zoom position detection unit 125 and the zoom speed detection unit 126 are output to the zoom control unit 127. The zoom control unit 127 then outputs the information to the system control unit 114.

This embodiment will be described below on the assumption that processing is implemented by each block of the digital camera 100 as hardware. However, the execution of the present invention is not limited to this, and processing by each block may be implemented by a program for performing the same processing as that by each block.

<<Outline of Generation of HDR Moving Image>>

An outline of processing associated with the generation of an HDR image as one frame of an HDR moving image in HDR moving image capturing processing in this embodiment (to be described later) will be described with reference to the accompanying drawings.

Figure 2A:
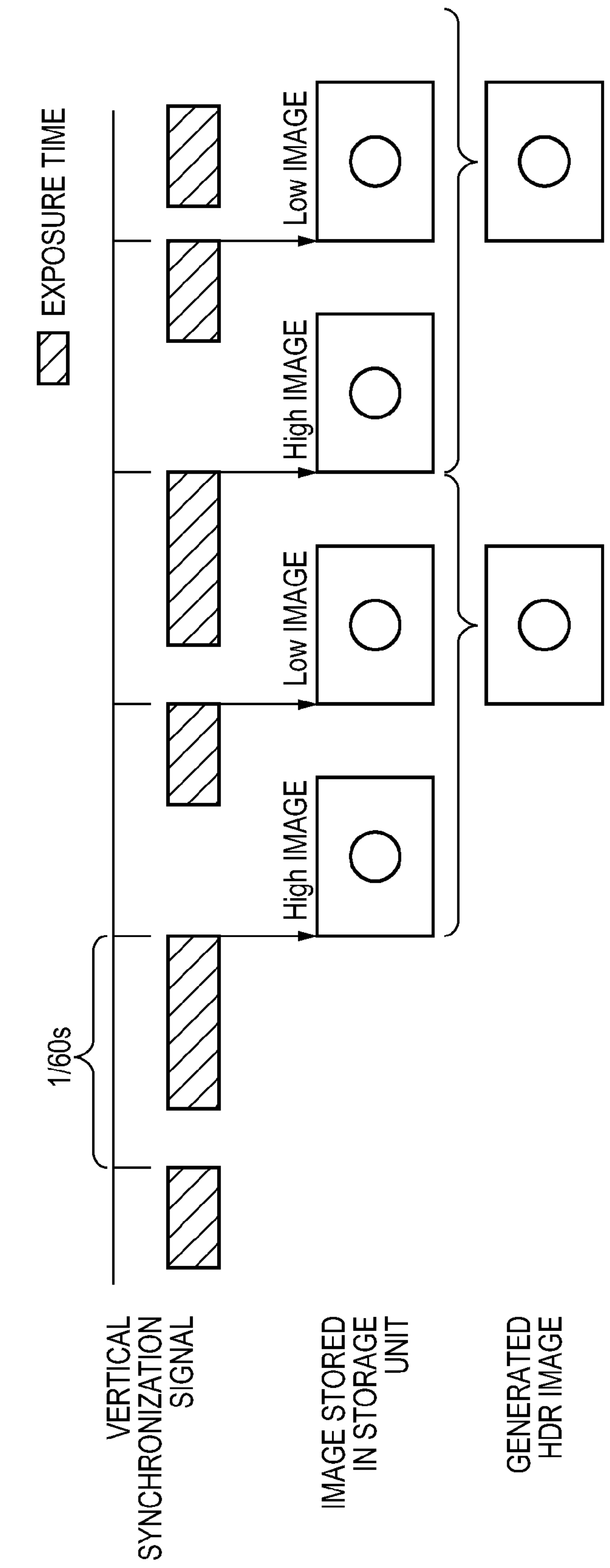
FIGS. 2A and 2B are views for explaining an outline of the generation of an HDR moving image according to the embodiment of the present invention.

FIG. 2A is a view showing image data (Low and High images) to be combined to generate a frame of an HDR moving image when, for example, the digital camera 100 is set in the HDR moving image capturing mode. As shown in FIG. 2A, when moving image capturing associated with the generation of an HDR moving image starts, the frame memory 113 alternately stores High and Low images from the image sensor 105 at 60 fps (1/60 sec intervals) in accordance with a vertical synchronization signal. More specifically, upon deciding a proper exposure Ev(O) concerning a subject luminance distribution, the system control unit 114 sets an exposure setting Bv(H) increased by one step as an exposure setting for a High image and then causes the image sensor 105 and the shutter/stop driving control unit 110 to perform exposure control. In addition, the system control unit 114 sets an exposure setting Bv(L) decreased from the proper exposure by one step as an exposure setting for a Low image and then causes the image sensor 105 and the shutter/stop driving control unit 110 to perform exposure control. The system control unit 114 can sequentially obtain High and Low images by alternately changing exposure settings at 60 fps in this manner.

FIG. 2A shows a state in which the user has not performed any zooming operation during moving image capturing. In this case, since the angle of view is not changed, the system control unit 114 obtains a composite image associated with a frame of an HDR moving image to be recorded by causing the video signal processing unit 107 to combine consecutive High and Low images while only positioning them.

Figure 2B:
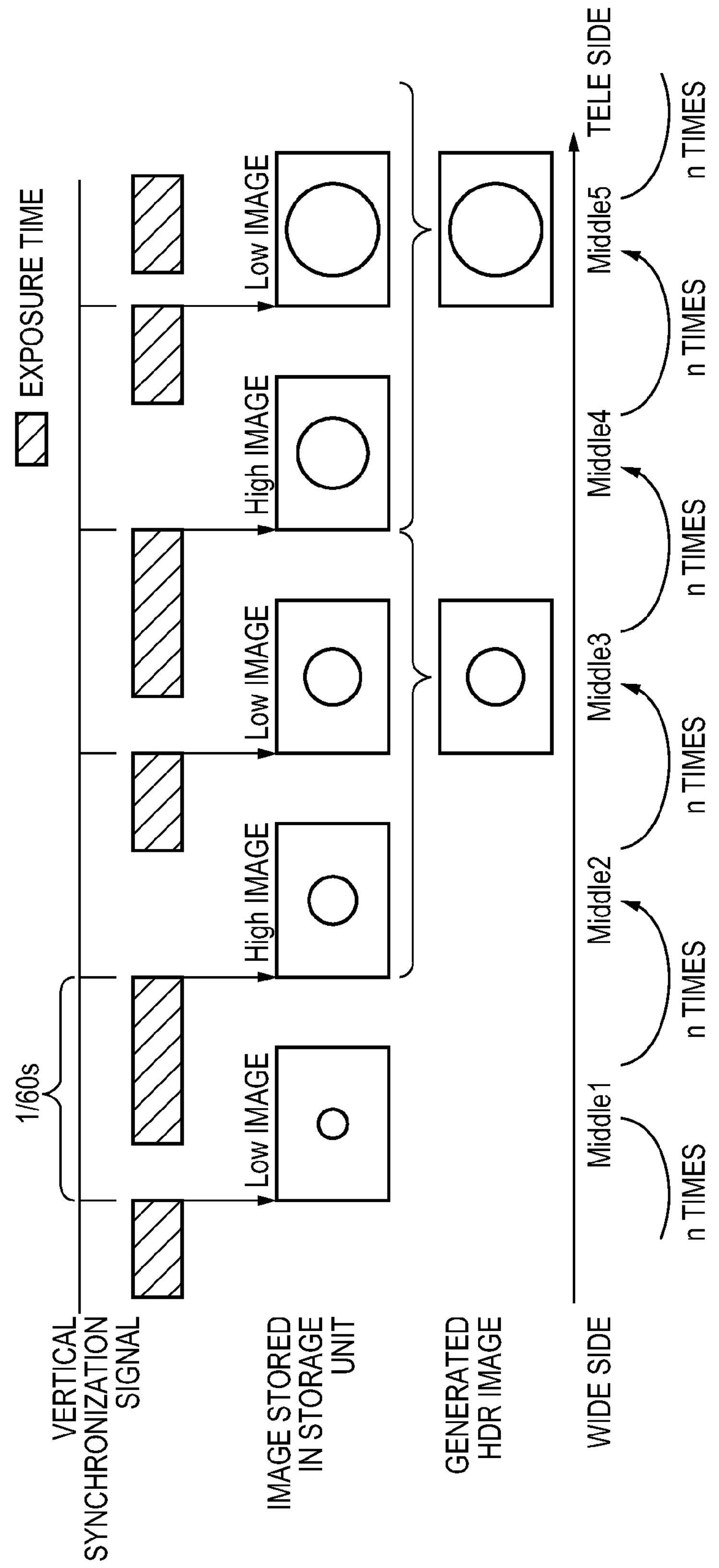

Consider a case in which the user has performed zooming operation during moving image capturing, as shown in FIG. 2B. In the case shown in FIG. 2B, the user has issued a zoom instruction to monotonically increase the magnification of each frame by n times from the wide-angle (WIDE) side to the telephoto (TELE) side during moving image capturing. At this time, the High and Low images consecutively output differ in angle of view at the time of image capturing, and hence the video signal processing unit 107 cannot simply combine two images unlike in the case shown in FIG. 2A.

For this reason, when generating a composite image from a plurality of images having undergone zooming operation during moving image capturing, that is, a plurality of images with different angles of view at the time of image capturing, the digital camera 100 according to this embodiment performs adjustment processing for at least some of the images to combine images with the same angle of view. Note that this embodiment will be described below on the assumption that only two types of images, namely, High and Low images, are used for combining operation. However, the practice of the present invention is not limited to this. That is, three or more types of to-be-combined images may be used. If the to-be-combined images differ in angle of view at the time of image capturing, the apparatus performs adjustment processing for to-be-combined images which differ in angle of view from any one reference composite image to change all the to-be-combined images into images having the same angle of view and the same number of pixels, and uses them for combining operation.

Figure 3A:
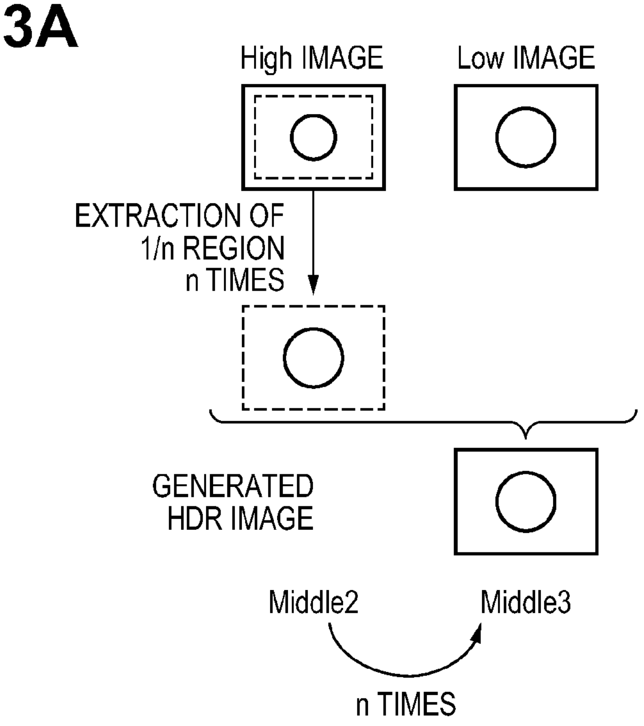
FIGS. 3A and 3B are views for explaining angle-of-view adjustment in the generation of an HDR moving image according to the embodiment of the present invention.

For example, as shown in FIG. 3A, in adjustment processing for angles of view, the apparatus extracts a region (a region with the number of pixels 1/n that of a High image) corresponding to a Low image with a small angle of view from a High image with a large angle of view, and enlarges the extracted image by n times. That is, the apparatus adjusts the angle of view of the High image in accordance with the angle-of-view ratio between the High image and the Low image. This can change High and Low images having different angles of view into images having the same angle of view and the number of pixels.

Figure 3B:
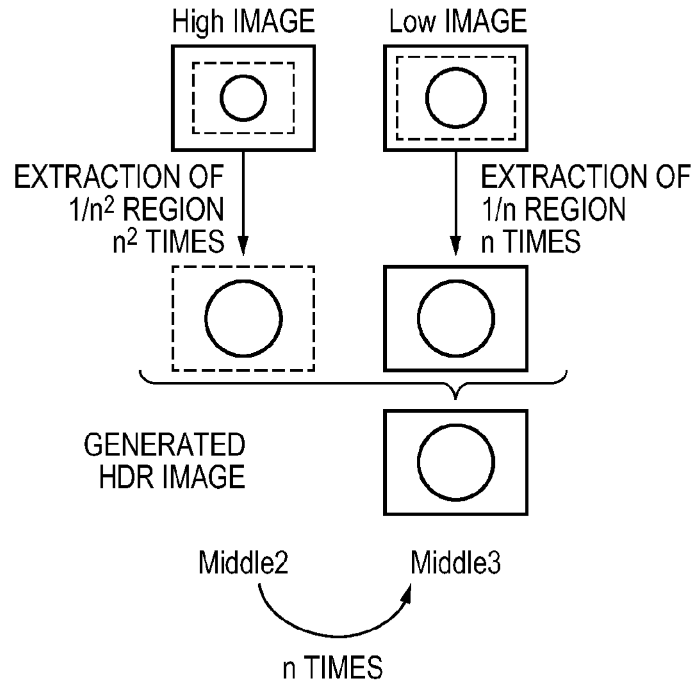

This embodiment will be described on the assumption that the apparatus extracts an image from a to-be-combined image which has a large angle of view and performs enlargement processing, as shown in FIG. 3A. However, as shown in FIG. 3B, the apparatus may process all the to-be-combined images in the same manner. Assume that the apparatus extracts a region with the number of pixels 1/n that of a Low image from the Low image, enlarges the image by n times, and combine the resultant images. In this case, the apparatus may extract, from a High image, a corresponding region with the number of pixels $1/n^2$ that of the extracted region, enlarge the image by $n^2$ times, and combine the resultant images. When, however, performing angle-of-view adjustment for all the to-be-combined images in this manner, the resultant moving image differs in zoom speed and apparent angle of view from the captured moving image. For this reason, the present invention preferably does not perform angle-of-view adjustment for at least one to-be-combined image.

FIG. 2B has exemplified the case in which zooming operation has been performed from the wide-angle side to the telephoto side. When, however, zooming operation has been performed from the telephoto side to the wide-angle side, the system control unit 114 select a combination of to-be-combined images in the following manner. The system control unit 114 selects different combinations of to-be-combined images so as to change images, of the to-be-combined images, which are subjected to angle-of-view adjustment, that is, to-be-combined images on the wide-angle side, into High images. That is, when the user performs zooming operation from the wide-angle side to the telephoto side, the system control unit 114 selects, as to-be-combined images, a High image with a wide angle of view and a Low image with a small angle of view which is obtained afterward. In contrast to this, when the user performs zooming operation from the telephoto side to the wide-angle side, the system control unit 114 selects, as to-be-combined images, a Low image with a small angle of view and a High image with a large angle of view which is obtained afterward. This is because a High image exhibits a high exposure.

In general, an image including a blown-out highlight or overbright region, like an image captured at an exposure set to be higher than a proper exposure, has a small amount of subject information included in a tonal range, and hence can make an undesirable impression on a person who browses the image. For this reason, according to this embodiment, for an image whose information amount is reduced by angle-of-view adjustment, the system control unit 114 changes the combination of to-be-combined images in accordance with zooming operation so as to select a High image originally having a small amount of subject information included in a tonal range.

This embodiment will be described on the assumption that a High image has a smaller amount of subject information included in a tonal range than a Low image. However, the method of deciding a combination of to-be-combined images is not limited to this. For example, the system control unit 114 may decide a combination by referring to the image data output at the time of selection of to-be-combined images so as to select an image which is free from blown-out highlight or shadow-detail loss and has a large number of pixels included in a tonal range as a to-be-combined image for which no angle-of-view adjustment is performed.

<<HDR Moving Image Capturing Processing>>

Figure 4:
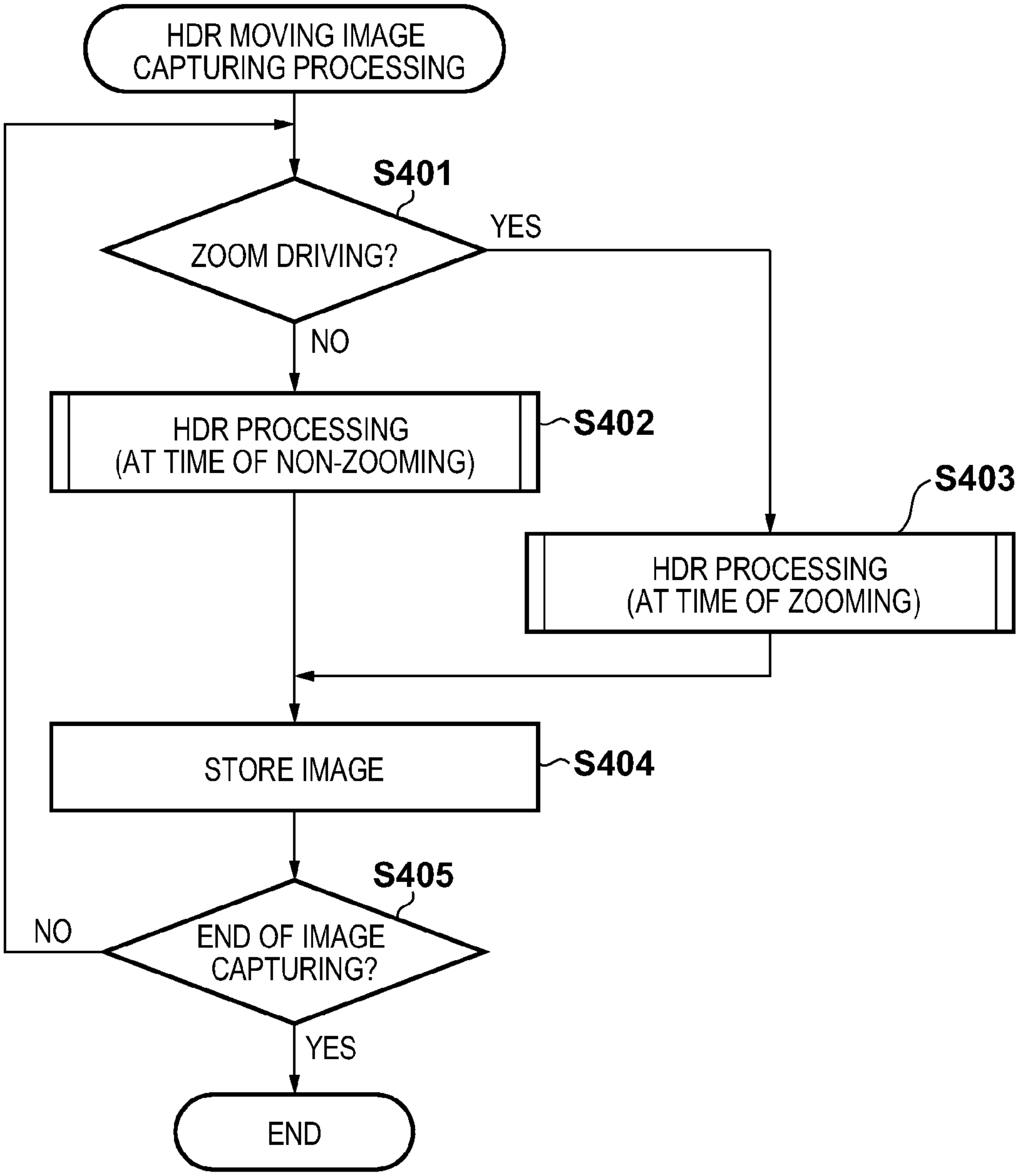
FIG. 4 is a flowchart exemplifying HDR moving image capturing processing executed by the digital camera 100 according to the embodiment of the present invention.

Concrete HDR moving image capturing processing performed by the digital camera 100 according to this embodiment will be described with reference to the flowchart of FIG. 4. The system control unit 114 can implement the processing corresponding to this flowchart by reading out a corresponding processing program stored in a ROM (not shown) and executing the program upon extracting it in the RAM. Assume that this HDR moving image capturing processing starts when the system control unit 114 receives a control signal corresponding to an image capturing start instruction while the digital camera 100 is set in the HDR moving image capturing mode.

In step S401, the system control unit 114 determines whether the user has performed zooming operation. More specifically, the system control unit 114 determines whether it has received, from the zoom switch 115, a control signal indicating that the user has operated the zoom switch 115 to issue a zoom instruction. If the system control unit 114 determines that the user has performed zooming operation, it advances the process to step S403. If the system control unit 114 determines that the user has not performed zooming operation, it advances the process to step S402.

In step S402, the system control unit 114 executes HDR processing (at the time of non-zooming) to generate a frame image of an HDR moving image.

<HDR Processing (at Time of Non-Zooming)>

Figure 5A:
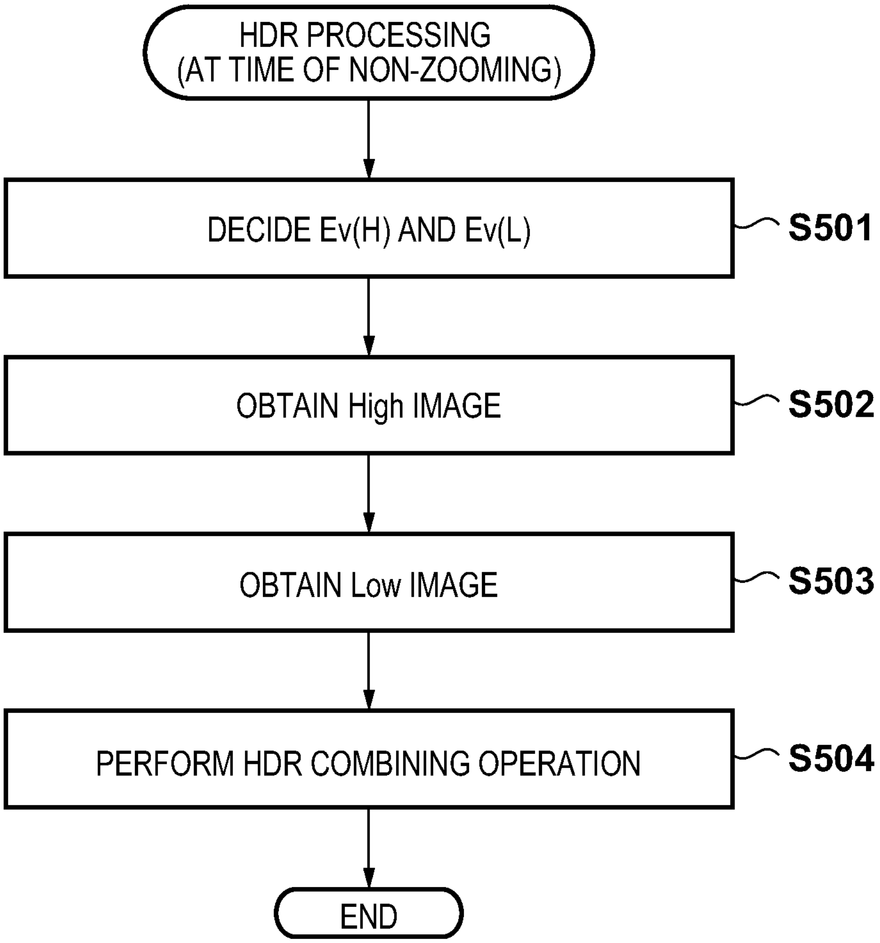
FIGS. 5A and 5B are flowcharts each exemplifying HDR processing executed by the digital camera 100 according to the embodiment of the present invention.

The HDR processing (at the time of non-zooming) executed in step S402 will be described in detail below with reference to the flowchart of FIG. 5A.

In step S501, the system control unit 114 obtains a proper exposure for a subject and decides an exposure setting Ev(H) for a High image and an exposure setting Ev(L) for a Low image.

In step S502, the system control unit 114 drives the mechanical shutter/stop unit 102 and the image sensor 105, based on the exposure setting for a High image, to capture a High image, and stores the obtained High image in the frame memory 113.

In step S503, the system control unit 114 drives the mechanical shutter/stop unit 102 and the image sensor 105, based on the exposure setting for a Low image, to capture a Low image, and stores the obtained Low image in the frame memory 113.

In step S504, the system control unit 114 combines the High and Low images stored in the frame memory 113 to generate a one-frame image of an HDR moving image. The system control unit 114 stores the generated frame image in the frame memory 113.

With this operation, the frame memory 113 stores an image corresponding to one frame of an HDR moving image to be generated.

Upon determining in step S401 that the user has performed zooming operation, the system control unit 114 executes HDR processing (at the time of zooming) to generate a frame image of an HDR moving image in step S403.

<HDR Processing (at Time of Zooming)>

Figure 5B:
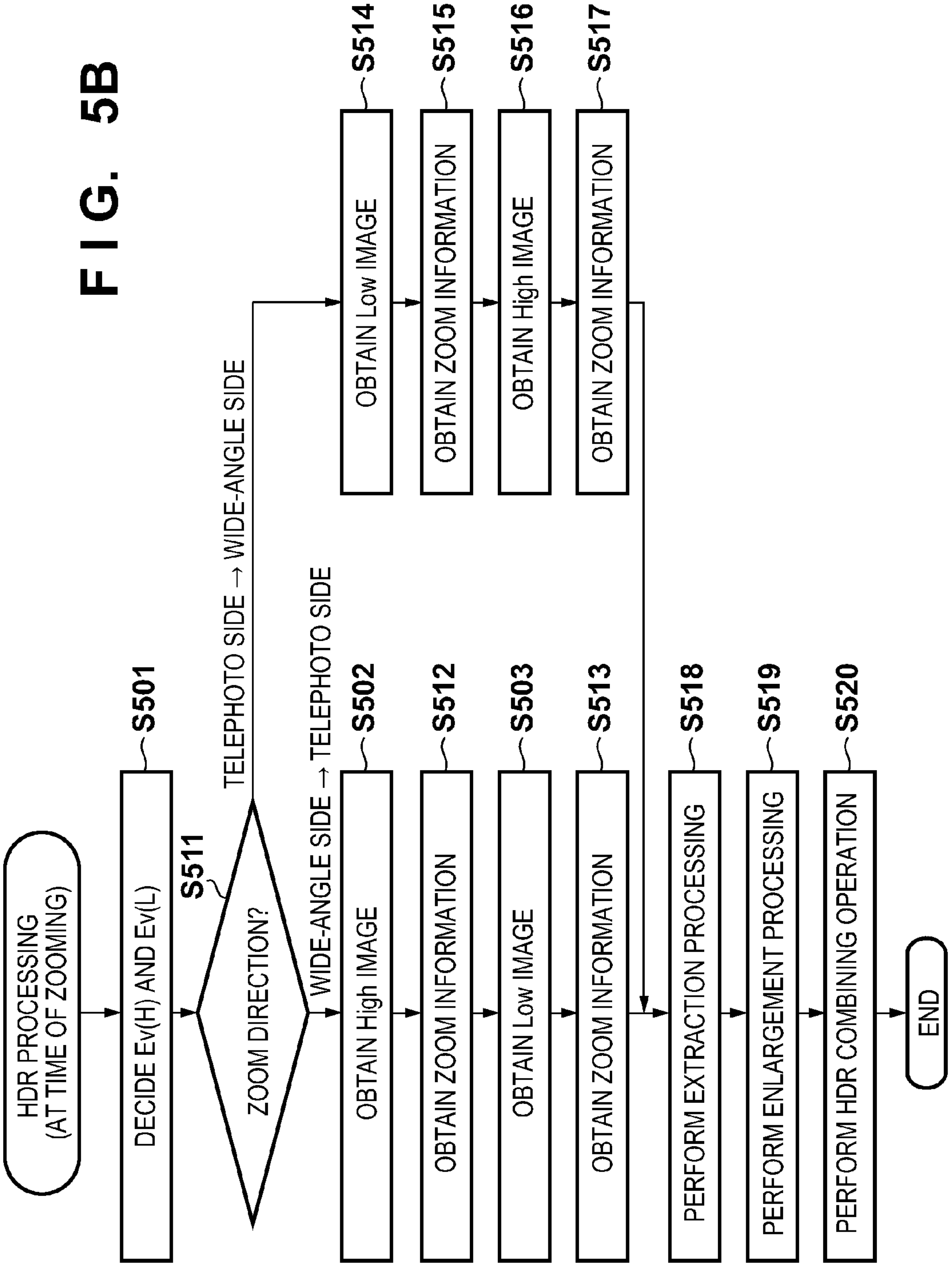

The HDR processing (at the time of zooming) executed in step S403 will be described in detail below with reference to the flowchart of FIG. 5B. The same step numbers in the HDR processing at the time of non-zooming described above denote the same processes in the HDR processing (at the time of zooming), and a description of them will be omitted. Only steps in which processes characteristic to HDR processing at the time of zooming are performed will be described below.

Upon deciding exposure settings for High and Low images in step S501, the system control unit 114 determines in step S511 whether the user performs zooming operation from the wide-angle side to the telephoto side or from the telephoto side to the wide-angle side. More specifically, the system control unit 114 determines the direction of zooming operation by determining to which operation the control signal received from the zoom switch 115 corresponds. If the system control unit 114 determines that the direction of zooming operation is from the wide-angle side to the telephoto side, it advances the process to step S502. If the system control unit 114 determines that the direction of zooming operation is from the telephoto side to the wide-angle side, it advances the process to step S514.

After the frame memory 113 stores a High image in step S502, the system control unit 114 obtains zoom information including the zoom position and zoom speed of the High image at the time of image capturing from the zoom driving control unit 109 in step S512. The system control unit 114 then advances the process to step S503.

After the frame memory 113 stores a Low image in step S503, the system control unit 114 obtains zoom information including the zoom position and zoom speed of the Low image at the time of image capturing from the zoom driving control unit 109 in step S513.

Upon determining in step S511 that the direction of zooming operation is from the telephoto side to the wide-angle side, the system control unit 114 drives the mechanical shutter/stop unit 102 and the image sensor 105 based on the exposure setting for a Low image to capture a Low image in step S514. The system control unit 114 then stores the obtained Low image in the frame memory 113.

In step S515, the system control unit 114 obtains zoom information including the zoom position and zoom speed of the Low image at the time of image capturing from the zoom driving control unit 109.

In step S516, the system control unit 114 drives the mechanical shutter/stop unit 102 and the image sensor 105, based on the exposure setting for a High image, to capture a High image, and stores the obtained High image in the frame memory 113.

In step S517, the system control unit 114 obtains zoom information including the zoom position and zoom speed of the High image at the time of image capturing from the zoom driving control unit 109.

Note that in the processing from step S514 to step S517, if the direction of zooming operation is from the telephoto side to the wide-angle side, the system control unit 114 captures a High image and a Low image in the order named. However, the system control unit 114 may change the order of image capturing to a Low image and a High image. Alternatively, the system control unit 114 may execute the processing from step S514 to step S517 for the Low and High images captured after a one-frame High image is captured.

In step S518, the system control unit 114 causes the video signal processing unit 107, based on the zoom information of High and Low images, to extract an image of a region corresponding to the Low image from the High image.

In step S519, the system control unit 114 causes the video signal processing unit 107 to apply enlargement processing to the image of the region extracted from the High image in step S518 to change the image into an image having the same number of pixels as that of the Low image.

In step S520, the system control unit 114 generates a one-frame image of an HDR moving image by combining the High and Low images which have undergone angle-of-view adjustment and stored in the frame memory 113. The system control unit 114 stores the generated frame image in the frame memory 113.

With this operation, the frame memory 113 stores an image corresponding to one frame of an HDR moving image to be generated.

Upon executing the HDR processing in step S402 or S403, the system control unit 114 causes the video signal processing unit 107 to perform developing processing for a frame image of the HDR moving image stored in the storage unit 118 by the system control unit 114, and causes the storage unit 118 to store the frame image as a frame of the HDR moving image in step S404. The system control unit 114 also transmits the developed frame image to the display unit 108 to make it display the image.

In step S405, the system control unit 114 determines whether moving image capturing continues. More specifically, the system control unit 114 determines to continue or stop moving image capturing by determining whether it has received a control signal corresponding to an image capturing end instruction from the shutter release switch 117. If the system control unit 114 determines that moving image capturing is continuing, the process returns to step S401. Upon determining that moving image capturing is not continuing, the system control unit 114 terminates the HDR moving image capturing processing.

Although this embodiment has exemplified the case in which the present invention is applied to the recording of an HDR moving image, the present invention is not limited to this. For example, the present invention may be applied to a case in which the apparatus displays, on the display unit 108, the frames obtained from the images, sequentially obtained by image capturing of a subject, by applying HDR processing to them instead of generating and recording an HDR moving image. In addition, the present invention can be applied to a technique of generating a camera shake compensation image or super-resolution image like that described above as well as an HDR moving image. That is, the present invention can be applied to an arbitrary device capable of generating one frame of a moving image by combining a plurality of images sequentially obtained by image capturing.

As described above, the image capturing apparatus according to this embodiment can generate a moving image with preferred image quality and a corrected angle-of-view shift by using a frame obtained by combining a plurality of frames of a moving image. More specifically, the image capturing apparatus sequentially obtains images obtained by image capturing of a subject and detects the angle of view of each obtained image at the time of image capturing. In addition, the apparatus sequentially selects a plurality of to-be-combined images, of obtained images, which are used to generate one frame, combines the selected to-be-combined images, and generates a moving image using each composite image as a frame. If a plurality of to-be-combined images differ in angle of view at the time of image capturing, the apparatus changes all the to-be-combined images into images having the same angle of view and the same number of pixels by adjusting at least the angles of view of to-be-combined images which differ from the angle of view of one reference to-be-combined image of a plurality of to-be-combined images at the time of image capturing, and combines the resultant images.

[Modification]

The above embodiment has exemplified the method without any consideration of distortion caused in a subject image due to the optical characteristics of the image capturing optical system. This modification will exemplify a method of generating an HDR moving image whose distortion due to the image capturing optical system has been corrected.

Figure 6A:
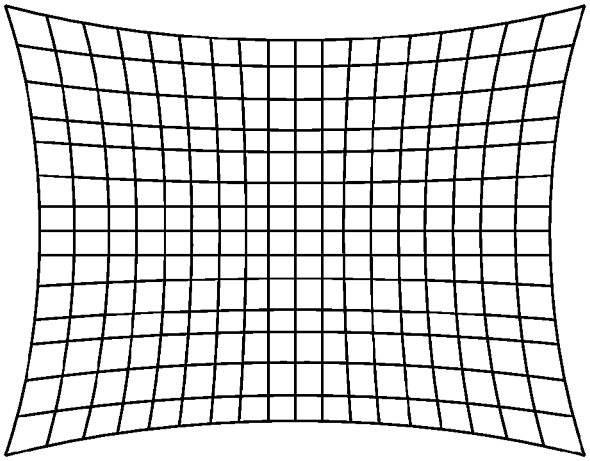
FIGS. 6A and 6B are views each for explaining distortion caused by an image capturing optical system.
Figure 6B:
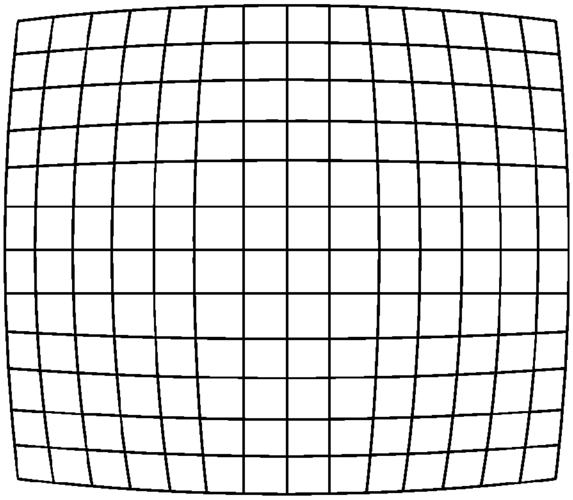

If an image obtained by image capturing has distortion, the following problem occurs when the apparatus combines a plurality of images obtained at the time of zooming in the above manner. In general, the distortion caused in a captured image changes in accordance with the zoom position of the image capturing optical system. More specifically, distortion deforms a subject image into a pincushion shape like that shown in FIG. 6A when the zoom position is located on the telephoto side, and into a barrel shape like that shown in FIG. 6B when the zoom position is located on the wide-angle side. That is, a plurality of images obtained at the time of zooming may differ in distortion ratio, and hence an image shift may occur when they are combined.

Assume that in this modification, distortion ratio change information corresponding to each zoom position of the image capturing optical system of the digital camera 100 is stored in advance in a ROM or the like (not shown) by, for example, image capturing of a lattice pattern or the like while changing the zoom position. This modification performs distortion correction for each to-be-combined image by using information indicating the relationship between the stored distortion ratio and the zoom position at the time of adjustment of an angle of view associated with the generation of a frame image of an HDR moving image. Note that it is preferable to perform distortion correction by using the known technique disclosed in, for example, Japanese Patent Laid-Open Nos. 11-250238, 11-250239, 11-250240, and 6-292207.

<<HDR Processing (at Time of Zooming)>>

HDR processing (at the time of zooming) in this modification in which distortion correction is performed will be described with reference to the flowchart of FIG. 7. The same step numbers in the HDR processing (at the time of zooming) in the above embodiment denote the same processes in the HDR processing (at the time of zooming) in the modification, and a description of them will be omitted. Only steps in which processes characteristic to the modification are performed will be described below.

After the completion of storage of Low and High images in the frame memory 113, the system control unit 114 obtains the distortion ratio of each of the High and Low images in step S701 based on the zoom information of the High and Low images.

In step S702, the system control unit 114 causes the video signal processing unit 107 to perform distortion correction for the High and Low images in accordance with each obtained distortion ratio. The process shifts to step S518.

This makes it possible to generate a composite image with preferred image quality which corresponds to one frame of an HDR moving image without causing an image shift due to distortion at the time of combining.

This modification has been described on the assumption that distortion correction is performed for both High and Low images. However, it is readily anticipated that distortion correction may be performed for either image. In this case, if, for example, distortion correction is performed for only a High image, the corrected High image becomes an image having the same aberration as the distortion caused in a Low image.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-103830, filed Apr. 27, 2012, which is hereby incorporated by reference herein in its entirety.

What is claimed is:

1. An image capturing apparatus comprising:
an obtaining unit configured to sequentially obtain images obtained by image capturing of a subject; and
a generation unit configured to combine a plurality of images obtained by said obtaining unit and generate a moving image including an obtained composite image as a frame,
wherein if the plurality of images differ in angle of view at the time of image capturing, said generation unit changes the plurality of images into images having the same angle of view by adjusting angles of view of images which differ in angle of view from one reference image of the plurality of images, and combines the images, and
whether the plurality of images differ in angle of view at the time of image capturing is detected by detecting whether zooming operation has been performed during image capturing of the plurality of images.

2. The apparatus according to claim 1, wherein if the plurality of images differ in angle of view at the time of image capturing, said generation unit extracts a region corresponding to an angle of view of the reference image from an image having a larger angle of view than the reference image, enlarges the extracted region in accordance with an angle-of-view ratio with the reference image, and uses the enlarged region for combining operation.

3. The apparatus according to claim 1, wherein images consecutively obtained by said obtaining unit are images captured at different exposures, and
said generation unit generates the composite image by combining the plurality of images respectively captured at the different exposures.

4. The apparatus according to claim 3, wherein if said obtaining unit obtains images at different angles of view at the time of image capturing, said generation unit sets an image, which is captured at relatively low exposure, as the reference image.

5. The apparatus according to claim 3, wherein said generation unit sets, as the reference image, an image having the largest number of pixels within a tonal range.

6. The apparatus according to claim 1, further comprising a distortion correction unit configured to perform distortion correction for the plurality of images based on an optical characteristic of an image capturing optical system used for image capturing,
wherein said distortion correction unit changes all the plurality of images into images having the same distortion by performing distortion correction for at least images which differ in angle of view at the time of image capturing from the reference image, when said generation unit adjusts the plurality of images.

7. The apparatus according to claim 1, further comprising a selection unit configured to sequentially select the plurality of images, of the images obtained by said obtaining unit, which are used to generate one frame,
wherein said generation unit combines the plurality of images selected by said selection unit.

8. The apparatus according to claim 1, wherein if the plurality of images, in which angles of view are adjusted, differ in number of pixels, said generation unit changes the plurality of images into images having the same number of pixels before combining.

9. A control method for an image capturing apparatus, the method comprising:
an obtaining step of causing an obtaining unit of the image capturing apparatus to sequentially obtain images obtained by image capturing of a subject; and
a generation step of causing a generation unit of the image capturing apparatus to combine a plurality of images obtained in the obtaining step and generate a moving image including an obtained composite image as a frame,
wherein if the plurality of images differ in angle of view at the time of image capturing, the generation unit in the generation step changes the plurality of images into images having the same angle of view by adjusting angles of view of images which differ in angle of view from one reference image of the plurality of images, and combines the images, and whether the plurality of images differ in angle of view at the time of image capturing is detected by detecting whether zooming operation has been performed during image capturing of the plurality of images.

10. A non-transitory computer -readable recording medium recording a program for causing a computer to function as:
an obtaining unit configured to sequentially obtain images obtained by image capturing of a subject; and
a generation unit configured to combine a plurality of images obtained by said obtaining unit and generate a moving image including an obtained composite image as a frame,
wherein if the plurality of images differ in angle of view at the time of image capturing, said generation unit changes the plurality of images into images having the same angle of view by adjusting angles of view of images which differ in angle of view from one reference image of the plurality of images, and combines the images, and
whether the plurality of images differ in angle of view at the time of image capturing is detected by detecting whether zooming operation has been performed during image capturing of the plurality of images.

11. An image capturing apparatus comprising:
an image capturing unit configured to sequentially capture images; and
a generation unit configured to combine a plurality of images captured by said capturing unit and generate a composite image as a frame of a moving image,
wherein if zooming operation has been performed during image capturing of the plurality of images, said generation unit generate the plurality of images having the same angle of view and combines the images.

12. A control method for an image capturing apparatus, the method comprising:
an image capturing step for sequentially capturing images; and
a generation step for combining a plurality of images captured by said capturing unit and generating a composite image as a frame of a moving image,
wherein if zooming operation has been performed during image capturing of the plurality of images, in the generation step, the plurality of images having the same angle of view are generated and the images are combined.

13. A non-transitory computer-readable recording medium recording a program for causing a computer to function as:

an image capturing unit configured to sequentially capture images; and a generation unit configured to combine a plurality of images captured by said capturing unit and generate a composite image as a frame of a moving image, wherein if zooming operation has been performed during image capturing of the plurality of images, said generation unit generate the plurality of images having the same angle of view and combines the images.

* * * * *